United States Patent [19]

Entes

[11] Patent Number: 4,549,478
[45] Date of Patent: Oct. 29, 1985

[54] APPARATUS FOR WASHING SLICES OF A TUBEROUS PLANT

[75] Inventor: Peter C. Entes, Noord Scharwoude, Netherlands

[73] Assignee: Smiths Food Group B.V., Netherlands

[21] Appl. No.: 620,683

[22] Filed: Jun. 14, 1984

[30] Foreign Application Priority Data

Jun. 16, 1983 [NL] Netherlands ............... 8302149

[51] Int. Cl.⁴ ............................................. A23N 15/00
[52] U.S. Cl. ...................................... 99/536; 15/3.12; 15/302; 99/516; 134/63; 426/506
[58] Field of Search ................. 99/495, 352, 509, 516, 99/534, 536, 537, 538, 567, 646 R; 134/61, 63, 66, 151, 199, 108; 15/3.11–3.13, 302; 426/506

[56] References Cited

U.S. PATENT DOCUMENTS

| | | | |
|---|---|---|---|
| 1,856,945 | 5/1932 | Currier et al. | 134/151 |
| 2,091,675 | 8/1937 | Ferry | 134/63 |
| 2,666,711 | 1/1954 | Crosset . | |
| 3,223,024 | 12/1965 | Benson | 99/352 |
| 3,399,414 | 9/1968 | McLauchlan | 15/3.11 |
| 4,251,895 | 2/1981 | Caridis et al. | 15/3.13 |

FOREIGN PATENT DOCUMENTS

| | | |
|---|---|---|
| 0023008 | 7/1979 | European Pat. Off. . |
| 1298769 | 7/1967 | Fed. Rep. of Germany . |
| 2423989 | 4/1979 | France . |

Primary Examiner—Timothy F. Simone
Attorney, Agent, or Firm—Kane, Dalsimer, Kane, Sullivan and Kurucz

[57] ABSTRACT

An apparatus for washing slices of a tuberous plant, in particular potatoes comprises a pre-washing unit with a water inlet. The slices are discharged by a slicer which is accommodated in said pre-washing unit. The apparatus further comprises an elongated rotatably supported washing tube connected to the pre-washing unit, and a vibrating sieve following the washing tube for conveying the slices. Said vibrating sieve is mounted above a receiving tank with an outlet and includes three sections. The first vibrating sieve section is adapted to separate shreds from the slices, the second vibrating sieve section comprises a re-washing unit connectable to a water supply, and the third vibrating sieve section is adapted to remove surface water from the slices.

10 Claims, 2 Drawing Figures

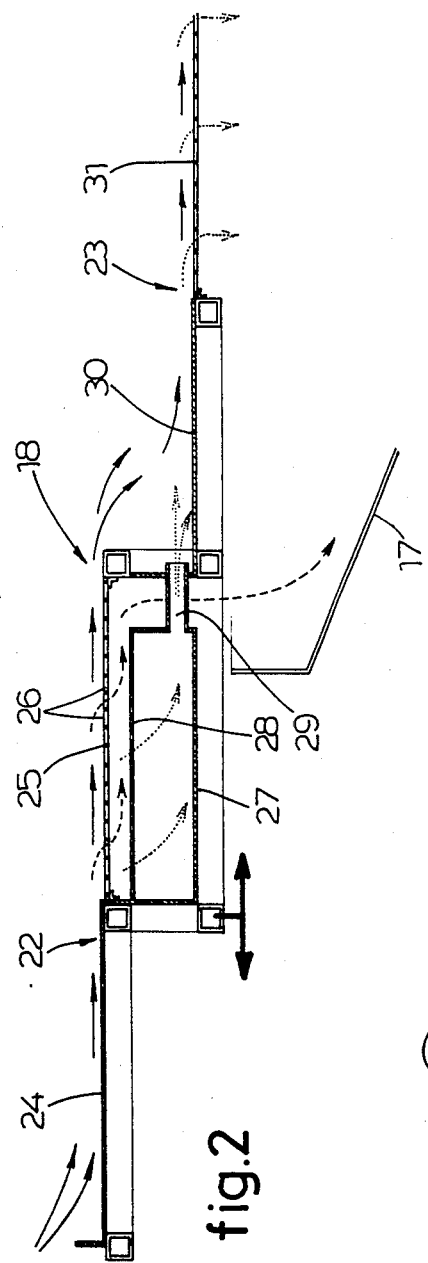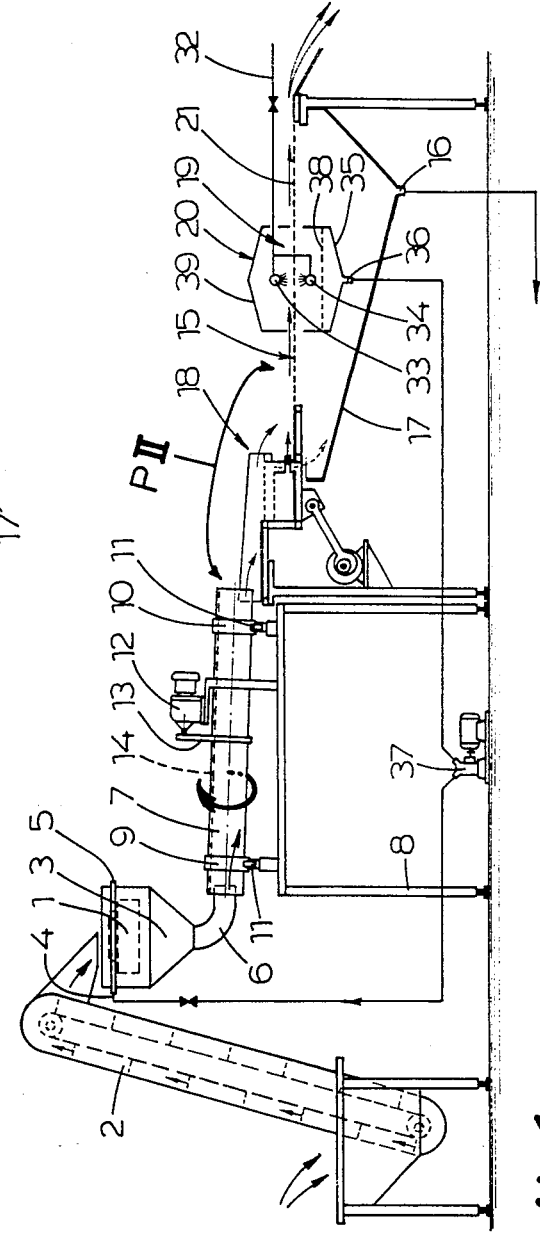

APPARATUS FOR WASHING SLICES OF A TUBEROUS PLANT

The invention relates to an apparatus for washing slices of a tuberous plant, in particular potatoes, discharged by a slicer.

At a known apparatus of this type, which is normally mentioned a torpedo washer, the apparatus comprises a tank in which a perforated cylinder is rotatably supported. The slices are dragged through the water in the tank by the rotating cylinder. This known apparatus shows the disadvantage that the water consumption is high, whereas the apparatus should be stopped periodically in order to remove the shreds and the like removed from the slices during the washing out of the tank.

At an other known apparatus of this type, which is normally mentioned counter flow washer, the water consumption is rather low but the shreds and the like are hardly separated from the slices.

The invention aims to provide an apparatus of the above-mentioned kind, wherein said disadvantages are obviated in a simple but nevertheless effective manner.

To this end, the apparatus according to the invention comprises a pre-washing unit with a water inlet, the slicer being accommodated in said pre-washing unit, an elongated, rotatably supported washing tube connected to the prewashing unit, and a vibrating sieve following the washing tube for conveying the slices, said vibrating sieve being mounted above a receiving tank with an outlet and including three sections, the first vibrating sieve section being adapted to separate shreds from the slices, the second vibrating sieve section comprising a re-washing unit connectable to a water supply, and the third vibrating sieve section being adapted to remove surface water from the slices.

In this manner an apparatus is obtained which shows a relatively low water consumption and wherein the slices are substantially not damaged during washing. The shreds and the like are very effectively separated from the slices, wherein the discharge thereof from the receiving tank disposed under the vibrating sieve takes place automatically through the outlet together with the consumed water.

Preferably, the re-washing unit is provided with a water receiving trough disposed beneath the second vibrating sieve section, an outlet of said water receiving trough being connected to the water inlet of the pre-washing unit. Thereby, a very economical use of the water is realised.

According to a favourable embodiment of the invention the first vibrating sieve section consists of two parts, a water receiving bin being mounted under a portion of the first part which joins the washing tube, said water receiving bin being closed at its upper side by a fine sieve plate and having a plurality of discharge tubes regularly distributed along the width of the vibrating sieve, wherein said discharge tubes debouch on the second part of the first vibrating sieve section lying lower than the first part, said second part including a closed plate joining said first part. In the first part of the first vibrating sieve section the actual separation of the shreds and the like from the slices takes place, wherein however, the water is separated from the shreds and the like by means of the fine sieve plate and is supplied to the slices again in order to prevent that the slices cling to each other.

According to a further embodiment of the invention the pre-washing unit comprises a circular spray tube connected to the water inlet and the outlet apertures of which are directed to the knifes of the slicer. Thereby it is obtained that the slices delivered by the slicer are directly cleaned and, moreover it is prevented that the slices cling together.

The invention will be further explained by reference to the drawings in which an embodiment of the apparatus according to the invention is shown.

FIG. 1 is a schematically shown side view partially in cross-section of an embodiment of the apparatus according to the invention.

FIG. 2 shows the part II of FIG. 1 in a larger scale.

Referring to FIG. 1, there is shown an apparatus for washing slices of a tuberous plant, in particular potatoes, discharged by a slicer 1. As indicated by arrows in FIG. 1 the potatoes are supplied to a conveyer 2 which transports the potatoes to the slicer 1. The slicer 1 is accommodated in a pre-washing unit 3 equiped with a water inlet 4. The water inlet 4 joins a circular spray tube 5 the outlet apertures of which are directed to the knifes of the slicer 1 (not shown in the drawing). Thereby the slices delivered by the slicer 1 are immediately washed and clinging together of the slices is counteracted.

The pre-washing unit 3 is connected to an elongated washing tube 7 by a curved outlet tube 6. The washing tube 7 is rotatably supported on a frame 8. To this end the washing tube 7 is provided with true round rings 9, 10 near its ends, said rings 9, 10 being supported on rollers 11. The washing tube 7 is driven by a motor 12 mounted on the frame 8, a driving pulley of the motor 12 being coupled to the washing tube 7 by a belt 13. At the inner wall of the washing tube 7 an axially extending agitator 14 is provided indicated by a dashed line in the drawing. The slices discharged by the slicer 1 are supplied to the washing tube 7 together with the water supplied to the water inlet 4 of the pre-washing unit 3. The washing tube 7 provides for a further cleaning of the slices by the rotating washing action. The washing tube 7 which extends obliquely downwardly in transport direction, transports the slices during the washing action to a vibrating sieve 15 following the washing tube 7, which vibrating sieve 15 further conveys the slices as indicated by arrows.

The vibrating sieve 15 is mounted above a receiving tank 17 equiped with an outlet 16. The vibrating sieve 15 comprises a first vibrating sieve section 18 adapted to separate shreds and the like from the slices and shown in FIG. 2 in a larger scale. Further, the vibrating sieve 15 comprises a vibrating sieve section 19 which includes a rewashing unit 20. Finally, there is a third vibrating sieve section 21 adapted to remove surface water from the slices.

The first vibrating sieve section 18 shown in detail in FIG. 2 consists of a first part 22 and a second part 23 lying lower than the first part. The first part 22 of the first vibrating section 18 comprises a closed plate 24 directly joining the washing tube 7 and a sieve plate 25 which forms a part of the vibrating sieve 15. Of course, the openings 26 of the sieve plate 25 just as the openings of the remaining part of the vibrating sieve 15 are chosen in such a manner that only the slices with desired sizes are conveyed over the vibrating sieve 15, whereas slices which are too small, shreds and the like drop through the vibrating sieve 15 in the receiving tank 17.

A water receiving bin 27 is mounted under the sieve plate 25, which water receiving bin 27 is closed at its upper side by a fine sieve plate 28 the openings of which are chosen in such a manner that only water can arrive in the receiving bin 27. The water receiving bin 27 is provided with a plurality of discharge tubes 29 regularly distributed along the width of the vibrating sieve 15, only one of said discharge tubes 29 being shown in FIG. 2. The discharge tubes 29 debouch on the second part 23 of the first vibrating sieve section 18, which second part also comprises a closed plate 30 and a sieve plate 31. The first part 22 of the first vibrating sieve section 18 provides for the primary separation of the shreds and the like from the slices because the sieve plate 25 transports the slices further and lets through the shreds and the like together with the water, wherein the fine sieve plate 28 separates the water from the shreds and the like. Through the discharge tubes 29 the water is supplied again to the slices on the plate 30 in order to prevent clinging together of the slices and to remove possibly remaining shreds from the slices. The sieve plate 31 provides for a further separation of the shreds from the slices, wherein the consumed water is discharged also.

The first vibrating sieve section 18 is followed by the second vibrating sieve section 19 with the re-washing unit 20. The re-washing unit 20 is connected to a water supply 32 and is provided with two spray tubes 33, 34 extending substantially along the whole width of the second vibrating sieve section 19 and being mounted above and beneath the second vibrating sieve section 19, respectively. The re-washing unit 20 further comprises a water receiving trough, an outlet 36 of which is connected to the water inlet of the pre-washing unit 3 through a pump 37. Therefore, the slices are re-washed in the re-washing unit 20 in order to remove possibly present shreds and the like and to realise a very effective and thorough cleaning of the slices. As the slices are already washed in the pre-washing unit 3 and the washing tube 7, the consumed water will hardly get dirty so that this water is suited to be used in the pre-washing unit 3. Thereby the over-all water consumption of the apparatus described will be restricted to a minimum.

If desired, a fine sieve plate 38 can be mounted in the water receiving trough 35. Further, a hood 39 is provided for counteracting splashes to the environment. The second vibrating sieve section 19 is finally followed by a third vibrating sieve section 21 where the surface water of the slices is removed. Thereby, the slices are delivered to a following processing station in a relatively dry state. In case of potato slices this following processing station could for example be an oven in which the slices are processed to obtain so-called chips. It will be clear that it is of importance to deliver the slices to the oven as dry as possible.

The outlet 16 of the receiving tank 17 can be connected to a centrifuge installation where the starch particles and the like are removed from the water. The discharge of water, starch, shreds and the like from the receiving tank 17 takes place continuously during the operation of the apparatus described.

The invention is not restricted to the above-described embodiment which can be varied in a number of ways within the scope of the invention.

I claim:

1. Apparatus for washing slices of a tuberous plant, in particular potatoes, discharged by a slicer, said apparatus comprising a pre-washing unit with water inlet, the slicer being accommodated in said pre-washing unit, an elongated, rotatably supported washing tube connected to the pre-washing unit, a vibrating sieve having first, second and third vibrating sieve sections, following the washing tube for conveying the slices, and a receiving tank with an outlet, said vibrating sieve being mounted above the receiving tank, the first vibrating sieve section being adapted to separate shreds from the slices and consisting of a first and second part, and a water receiving bin, said first part having a portion joined to said washing tube, said second part being disposed at a lower level than said first part, said second part including a closed plate joining said first part, said water receiving bin being mounted under the first part, said water receiving bin being closed at its upper side by a fine sieve plate and having a plurality of discharge tubes regularly distributed along the width of the vibrating sieve, wherein said discharge tubes debouch on the second part of the first vibrating sieve section, the second vibrating sieve section comprising a re-washing unit connectable to a water supply, and the third vibrating sieve section being adapted to remove surface water from the slices.

2. Apparatus according to claim 1, wherein the re-washing unit is provided with a water receiving trough disposed beneath the second vibrating sieve section, an outlet of said water receiving trough being connected to the water inlet of the pre-washing unit.

3. Apparatus according to claim 1, wherein said first part of first vibrating sieve section includes a closed plate directly joining the washing tube.

4. Apparatus according to claim 1, wherein the pre-washing unit comprises a circular spray tube connected to the water inlet and has outlet apertures, and said slicer having knives, said outlet apertures being directed toward said knives.

5. Apparatus according to claim 1, wherein the re-washing unit comprises two spray tubes extending substantially along the whole width of the second vibrating sieve section, said two spray tubes being mounted above and beneath the second vibrating sieve section, respectively.

6. Apparatus according to claim 2, wherein a fine sieve plate is mounted above the outlet in the water receiving trough of the re-washing unit.

7. Apparatus according to claim 2, wherein the outlet the water receiving trough of the re-washing unit is connected through a pump to the water inlet of the prewashing unit.

8. Apparatus according to claim 1, wherein the washing tube extends obliquely downwardly in the transport direction.

9. Apparatus according to claim 1, wherein the washing tube has an inner wall and is provided with at least one agitator at its inner wall.

10. Apparatus according to claim 1, wherein the washing tube is provided with a true round ring adjacent both its ends, said rings being-supported on rollers, said washing tube being driven through a belt engaging around the washing tube by a driving pulley lying above the washing tube.

* * * * *